(12) United States Patent
Phan

(10) Patent No.: US 12,387,409 B2
(45) Date of Patent: Aug. 12, 2025

(54) AUTOMATED SYSTEM FOR GENERATION OF FACIAL ANIMATION RIGS

(71) Applicant: Electronic Arts Inc., Redwood City, CA (US)

(72) Inventor: Hau Nghiep Phan, Montreal (CA)

(73) Assignee: Electronic Arts Inc., Redwood City, CA (US)

( * ) Notice: Subject to any disclaimer, the term of this patent is extended or adjusted under 35 U.S.C. 154(b) by 48 days.

(21) Appl. No.: 18/048,822

(22) Filed: Oct. 21, 2022

(65) Prior Publication Data
US 2024/0135616 A1   Apr. 25, 2024
US 2024/0233230 A9   Jul. 11, 2024

(51) Int. Cl.
*G06T 13/40*   (2011.01)
*G06T 17/20*   (2006.01)

(52) U.S. Cl.
CPC .............. *G06T 13/40* (2013.01); *G06T 17/20* (2013.01)

(58) Field of Classification Search
CPC ................................ G06T 13/40; G06T 17/20
USPC .......................................................... 345/423
See application file for complete search history.

(56) References Cited

U.S. PATENT DOCUMENTS

| | | |
|---|---|---|
| 5,274,801 A | 12/1993 | Gordon |
| 5,548,798 A | 8/1996 | King |
| 5,982,389 A | 11/1999 | Guenter et al. |
| 5,999,195 A | 12/1999 | Santangeli |
| 6,064,808 A | 5/2000 | Kapur et al. |
| 6,088,040 A | 7/2000 | Oda et al. |
| 6,253,193 B1 | 6/2001 | Ginter et al. |
| 6,556,196 B1 | 4/2003 | Blanz et al. |
| 6,961,060 B1 | 11/2005 | Mochizuki et al. |
| 7,006,090 B2 | 2/2006 | Mittring |
| 7,403,202 B1 | 7/2008 | Nash |
| 7,415,152 B2 | 8/2008 | Jiang et al. |
| 7,944,449 B2 | 5/2011 | Petrovic et al. |
| 8,100,770 B2 | 1/2012 | Yamazaki et al. |
| 8,142,282 B2 | 3/2012 | Canessa et al. |
| 8,154,544 B1 | 4/2012 | Cameron et al. |
| 8,207,971 B1 | 6/2012 | Koperwas et al. |
| 8,267,764 B1 | 9/2012 | Aoki et al. |

(Continued)

FOREIGN PATENT DOCUMENTS

| | | |
|---|---|---|
| CN | 102509272 A | 6/2012 |
| CN | 103546736 A | 1/2014 |

(Continued)

OTHER PUBLICATIONS

Ali, Kamran, and Charles E. Hughes. "Facial expression recognition using disentangled adversarial learning." arXiv preprint arXiv: 1909.13135 (2019). (Year: 2019).

(Continued)

*Primary Examiner* — Hai Tao Sun
(74) *Attorney, Agent, or Firm* — Knobbe, Martens, Olson & Bear, LLP

(57) ABSTRACT

Systems and methods are provided for technical improvements with respect to generation of facial expressions, facial riggings, and models for characters configured for use in electronic games. The systems and methods may generate a facial animation rig that can be used to generate realistic facial expressions based on analyzing data captured from real-world persons. Advantageously, the system may allow for substantially automated facial rig generation.

20 Claims, 8 Drawing Sheets

(56) References Cited

U.S. PATENT DOCUMENTS

| | | | |
|---|---|---|---|
| 8,281,281 B1 | 10/2012 | Smyrl et al. |
| 8,395,626 B2 | 3/2013 | Millman |
| 8,398,476 B1 | 3/2013 | Sidhu et al. |
| 8,406,528 B1 | 3/2013 | Hatwich |
| 8,540,560 B2 | 9/2013 | Crowley et al. |
| 8,599,206 B2 | 12/2013 | Hodgins et al. |
| 8,624,904 B1 | 1/2014 | Koperwas et al. |
| 8,648,863 B1 | 2/2014 | Anderson et al. |
| 8,860,732 B2 | 10/2014 | Popovic et al. |
| 8,914,251 B2 | 12/2014 | Ohta |
| 9,067,097 B2 | 6/2015 | Lane et al. |
| 9,098,766 B2 | 8/2015 | Dariush et al. |
| 9,117,134 B1 | 8/2015 | Geiss et al. |
| 9,177,409 B2 | 11/2015 | Rennuit et al. |
| 9,208,613 B2 | 12/2015 | Mukai |
| 9,256,973 B2 | 2/2016 | Koperwas et al. |
| 9,317,954 B2 | 4/2016 | Li et al. |
| 9,483,860 B2 | 11/2016 | Hwang et al. |
| 9,616,329 B2 | 4/2017 | Szufnara et al. |
| 9,741,146 B1 | 8/2017 | Nishimura |
| 9,811,716 B2 | 11/2017 | Kim et al. |
| 9,826,898 B1 | 11/2017 | Jin et al. |
| 9,827,496 B1 | 11/2017 | Zinno |
| 9,858,700 B2 | 1/2018 | Rose et al. |
| 9,928,663 B2 | 3/2018 | Eisemann et al. |
| 9,947,123 B1 | 4/2018 | Green |
| 9,984,658 B2 | 5/2018 | Bonnier et al. |
| 9,987,749 B2 | 6/2018 | Nagendran et al. |
| 9,990,754 B1 | 6/2018 | Waterson et al. |
| 10,022,628 B1 | 7/2018 | Matsumiya et al. |
| 10,096,133 B1 | 10/2018 | Andreev |
| 10,118,097 B2 | 11/2018 | Stevens |
| 10,163,001 B2 | 12/2018 | Kim et al. |
| 10,198,845 B1 | 2/2019 | Bhat et al. |
| 10,297,066 B2 | 5/2019 | Brewster |
| 10,314,477 B1 | 6/2019 | Goodsitt et al. |
| 10,388,053 B1 | 8/2019 | Carter, Jr. et al. |
| 10,403,018 B1 | 9/2019 | Worsham |
| 10,535,174 B1 | 1/2020 | Rigiroli et al. |
| 10,565,731 B1 | 2/2020 | Reddy et al. |
| 10,726,611 B1 | 7/2020 | Court |
| 10,733,765 B2 | 8/2020 | Andreev |
| 10,755,466 B2 | 8/2020 | Chamdani et al. |
| 10,783,690 B2 | 9/2020 | Sagar et al. |
| 10,792,566 B1 | 10/2020 | Schmid |
| 10,810,780 B2 | 10/2020 | Hutchinson et al. |
| 10,818,065 B1 | 10/2020 | Saito et al. |
| 10,856,733 B2 | 12/2020 | Anderson et al. |
| 10,860,838 B1 | 12/2020 | Elahie et al. |
| 10,878,540 B1 | 12/2020 | Stevens |
| 10,902,618 B2 | 1/2021 | Payne et al. |
| 11,017,560 B1 | 5/2021 | Gafni et al. |
| 11,062,494 B2 | 7/2021 | Orvalho et al. |
| 11,113,860 B2 | 9/2021 | Rigiroli et al. |
| 11,217,003 B2 | 1/2022 | Akhoundi et al. |
| 11,232,621 B2 | 1/2022 | Akhoundi et al. |
| 11,295,479 B2 | 4/2022 | Andreev |
| 11,504,625 B2 | 11/2022 | Stevens |
| 11,648,480 B2 | 5/2023 | Akhoundi |
| 11,798,176 B2 | 10/2023 | Payne et al. |
| 11,836,843 B2 | 12/2023 | Akhoundi et al. |
| 11,992,768 B2 | 5/2024 | Akhoundi et al. |
| 2002/0013172 A1 | 1/2002 | Kaku et al. |
| 2002/0054054 A1 | 5/2002 | Sanbe |
| 2002/0089504 A1 | 7/2002 | Merrick et al. |
| 2002/0140696 A1 | 10/2002 | Futamura et al. |
| 2002/0180739 A1 | 12/2002 | Reynolds et al. |
| 2003/0038818 A1 | 2/2003 | Tidwell |
| 2004/0027352 A1 | 2/2004 | Minakuchi |
| 2004/0104912 A1 | 6/2004 | Yamamoto et al. |
| 2004/0138959 A1 | 7/2004 | Hlavac et al. |
| 2004/0227760 A1 | 11/2004 | Anderson et al. |
| 2004/0227761 A1 | 11/2004 | Anderson et al. |
| 2005/0237550 A1 | 10/2005 | Hu |
| 2006/0036514 A1 | 2/2006 | Steelberg et al. |
| 2006/0061574 A1 | 3/2006 | Ng-Thow-Hing et al. |
| 2006/0149516 A1 | 7/2006 | Bond et al. |
| 2006/0217945 A1 | 9/2006 | Leprevost |
| 2006/0250526 A1 | 11/2006 | Wang et al. |
| 2006/0262113 A1 | 11/2006 | Leprevost |
| 2006/0262114 A1 | 11/2006 | Leprevost |
| 2007/0085851 A1 | 4/2007 | Muller et al. |
| 2007/0097125 A1 | 5/2007 | Xie et al. |
| 2008/0049015 A1 | 2/2008 | Elmieh et al. |
| 2008/0111831 A1 | 5/2008 | Son et al. |
| 2008/0152218 A1 | 6/2008 | Okada |
| 2008/0268961 A1 | 10/2008 | Brook |
| 2008/0316202 A1 | 12/2008 | Zhou et al. |
| 2009/0066700 A1 | 3/2009 | Harding et al. |
| 2009/0315839 A1 | 12/2009 | Wilson et al. |
| 2010/0134501 A1 | 6/2010 | Lowe et al. |
| 2010/0251185 A1 | 9/2010 | Pattenden |
| 2010/0267465 A1 | 10/2010 | Ceminchuk |
| 2010/0277497 A1 | 11/2010 | Dong et al. |
| 2010/0302257 A1 | 12/2010 | Perez et al. |
| 2011/0012903 A1 | 1/2011 | Girard |
| 2011/0074807 A1 | 3/2011 | Inada et al. |
| 2011/0086702 A1 | 4/2011 | Borst et al. |
| 2011/0119332 A1 | 5/2011 | Marshall et al. |
| 2011/0128292 A1 | 6/2011 | Ghyme et al. |
| 2011/0164831 A1 | 7/2011 | Van Reeth et al. |
| 2011/0187731 A1 | 8/2011 | Tsuchida |
| 2011/0221755 A1 | 9/2011 | Geisner et al. |
| 2011/0269540 A1 | 11/2011 | Gillo et al. |
| 2011/0292055 A1 | 12/2011 | Hodgins et al. |
| 2011/0319164 A1 | 12/2011 | Matsushita et al. |
| 2012/0028706 A1 | 2/2012 | Raitt et al. |
| 2012/0083330 A1 | 4/2012 | Ocko |
| 2012/0115580 A1 | 5/2012 | Hornik et al. |
| 2012/0220376 A1 | 8/2012 | Takayama et al. |
| 2012/0244941 A1 | 9/2012 | Ostergren et al. |
| 2012/0303343 A1 | 11/2012 | Sugiyama et al. |
| 2012/0310610 A1 | 12/2012 | Ito et al. |
| 2012/0313931 A1 | 12/2012 | Matsuike et al. |
| 2013/0050464 A1 | 2/2013 | Kang |
| 2013/0063555 A1 | 3/2013 | Matsumoto et al. |
| 2013/0120439 A1 | 5/2013 | Harris et al. |
| 2013/0121618 A1 | 5/2013 | Yadav |
| 2013/0222433 A1 | 8/2013 | Chapman et al. |
| 2013/0235045 A1 | 9/2013 | Corazza et al. |
| 2013/0263027 A1 | 10/2013 | Petschnigg et al. |
| 2013/0271458 A1 | 10/2013 | Andriluka et al. |
| 2013/0293538 A1 | 11/2013 | Mukai |
| 2013/0311885 A1 | 11/2013 | Wang et al. |
| 2014/0002463 A1 | 1/2014 | Kautzman et al. |
| 2014/0035929 A1* | 2/2014 | Matthews ............... G06T 17/20 345/473 |
| 2014/0035933 A1 | 2/2014 | Saotome |
| 2014/0066196 A1 | 3/2014 | Crenshaw |
| 2014/0198106 A1 | 7/2014 | Sumner et al. |
| 2014/0198107 A1 | 7/2014 | Thomaszewski et al. |
| 2014/0267312 A1 | 9/2014 | Powell |
| 2014/0327694 A1 | 11/2014 | Cao et al. |
| 2014/0340644 A1 | 11/2014 | Haine et al. |
| 2015/0113370 A1 | 4/2015 | Flider |
| 2015/0126277 A1 | 5/2015 | Aoyagi |
| 2015/0187113 A1 | 7/2015 | Rubin et al. |
| 2015/0221131 A1* | 8/2015 | Luo ..................... G06T 17/20 345/419 |
| 2015/0235351 A1 | 8/2015 | Mirbach et al. |
| 2015/0243326 A1 | 8/2015 | Pacurariu et al. |
| 2015/0381925 A1 | 12/2015 | Varanasi et al. |
| 2016/0026926 A1 | 1/2016 | Yeung et al. |
| 2016/0042548 A1 | 2/2016 | Du et al. |
| 2016/0071470 A1 | 3/2016 | Kim et al. |
| 2016/0078662 A1 | 3/2016 | Herman et al. |
| 2016/0217723 A1 | 7/2016 | Kim et al. |
| 2016/0220903 A1 | 8/2016 | Miller et al. |
| 2016/0307369 A1 | 10/2016 | Freedman et al. |
| 2016/0314617 A1 | 10/2016 | Forster et al. |
| 2016/0353987 A1 | 12/2016 | Carrafa et al. |
| 2016/0354693 A1 | 12/2016 | Yan et al. |
| 2017/0090577 A1 | 3/2017 | Rihn |
| 2017/0132827 A1 | 5/2017 | Tena et al. |

(56) References Cited

U.S. PATENT DOCUMENTS

| | | | |
|---|---|---|---|
| 2017/0161909 A1 | 6/2017 | Hamanaka et al. | |
| 2017/0301310 A1 | 10/2017 | Bonnier et al. | |
| 2017/0301316 A1 | 10/2017 | Farell | |
| 2017/0372505 A1* | 12/2017 | Bhat | G06T 7/73 |
| 2018/0024635 A1 | 1/2018 | Kaifosh et al. | |
| 2018/0068178 A1 | 3/2018 | Theobalt et al. | |
| 2018/0122125 A1 | 5/2018 | Brewster | |
| 2018/0165864 A1 | 6/2018 | Jin et al. | |
| 2018/0211102 A1 | 7/2018 | Alsmadi | |
| 2018/0239526 A1 | 8/2018 | Varanasi et al. | |
| 2018/0338136 A1 | 11/2018 | Akaike et al. | |
| 2019/0121306 A1 | 4/2019 | Kaifosh et al. | |
| 2019/0122152 A1 | 4/2019 | McCoy et al. | |
| 2019/0172229 A1 | 6/2019 | Chan et al. | |
| 2019/0206181 A1 | 7/2019 | Sugai | |
| 2019/0325633 A1 | 10/2019 | Miller, IV et al. | |
| 2019/0392587 A1 | 12/2019 | Nowozin et al. | |
| 2020/0020138 A1 | 1/2020 | Smith et al. | |
| 2020/0020166 A1 | 1/2020 | Menard et al. | |
| 2020/0051304 A1 | 2/2020 | Choi et al. | |
| 2020/0078683 A1 | 3/2020 | Anabuki et al. | |
| 2020/0151963 A1 | 5/2020 | Lee et al. | |
| 2020/0226811 A1 | 7/2020 | Kim et al. | |
| 2020/0258280 A1 | 8/2020 | Park et al. | |
| 2020/0302668 A1 | 9/2020 | Guo et al. | |
| 2020/0306640 A1 | 10/2020 | Kolen et al. | |
| 2020/0310541 A1 | 10/2020 | Reisman et al. | |
| 2020/0364303 A1 | 11/2020 | Liu et al. | |
| 2021/0042526 A1 | 2/2021 | Ikeda et al. | |
| 2021/0074004 A1 | 3/2021 | Wang et al. | |
| 2021/0097266 A1 | 4/2021 | Mangalam et al. | |
| 2021/0125036 A1 | 4/2021 | Tremblay et al. | |
| 2021/0142440 A1 | 5/2021 | Ahn et al. | |
| 2021/0192357 A1 | 6/2021 | Sinha et al. | |
| 2021/0217184 A1 | 7/2021 | Payne et al. | |
| 2021/0220739 A1 | 7/2021 | Zinno et al. | |
| 2021/0252403 A1 | 8/2021 | Stevens | |
| 2021/0255304 A1 | 8/2021 | Fontijne et al. | |
| 2021/0279956 A1 | 9/2021 | Chandran et al. | |
| 2021/0308580 A1 | 10/2021 | Akhoundi et al. | |
| 2021/0312688 A1 | 10/2021 | Akhoundi et al. | |
| 2021/0312689 A1 | 10/2021 | Akhoundi et al. | |
| 2021/0316221 A1 | 10/2021 | Waszak | |
| 2021/0335039 A1 | 10/2021 | Jones et al. | |
| 2021/0390789 A1 | 12/2021 | Liu et al. | |
| 2022/0020195 A1 | 1/2022 | Kuta et al. | |
| 2022/0051003 A1 | 2/2022 | Niinuma et al. | |
| 2022/0138455 A1 | 5/2022 | Nagano et al. | |
| 2022/0198733 A1 | 6/2022 | Akhoundi et al. | |
| 2022/0222892 A1 | 7/2022 | Luo et al. | |
| 2022/0383578 A1 | 12/2022 | Kennewick, Sr. et al. | |
| 2022/0398795 A1 | 12/2022 | Phan | |
| 2022/0398796 A1 | 12/2022 | Phan | |
| 2022/0398797 A1 | 12/2022 | Phan | |
| 2023/0146141 A1 | 5/2023 | Stevens | |
| 2023/0186541 A1 | 6/2023 | Starke et al. | |
| 2023/0398456 A1 | 12/2023 | Akhoundi | |

FOREIGN PATENT DOCUMENTS

| | | |
|---|---|---|
| CN | 105405380 A | 3/2016 |
| CN | 105825778 A | 8/2016 |
| CN | 107427723 A | 12/2017 |
| CN | 109672780 A | 4/2019 |
| JP | 2018-520820 A | 8/2018 |
| JP | 2019-162400 A | 9/2019 |

OTHER PUBLICATIONS

Anagnostopoulos et al., "Intelligent modification for the daltonization process", International Conference on Computer Vision Published in 2007 by Applied Computer Science Group of digitized paintings.

Andersson, S., Goransson, J.: Virtual Texturing with WebGL. Master's thesis, Chalmers University of Technology, Gothenburg, Sweden (2012).

Avenali, Adam, "Color Vision Deficiency and Video Games", The Savannah College of Art and Design, Mar. 2013.

Badlani et al., "A Novel Technique for Modification of Images for Deuteranopic Viewers", May 2016.

Belytschko et al., "Assumed strain stabilization of the eight node hexahedral element," Computer Methods in Applied Mechanics and Engineering, vol. 105(2), pp. 225-260 (1993), 36 p.

Belytschko et al., Nonlinear Finite Elements for Continua and Structures, Second Edition, Wiley (Jan. 2014), 727 pages (uploaded in 3 parts).

Blanz V, Vetter T. A morphable model for the synthesis of 3D faces. In Proceedings of the 26th annual conference on Computer graphics and interactive techniques Jul. 1, 1999 (pp. 187-194). ACM Press/Addison-Wesley Publishing Co.

Blanz et al., "Reanimating Faces in Images and Video" Sep. 2003, vol. 22, No. 3, pp. 641-650, 10 pages.

Chao et al., "A Simple Geometric Model for Elastic Deformations", 2010, 6 pgs.

Cook et al., Concepts and Applications of Finite Element Analysis, 1989, Sections 6-11 through 6-14.

Cournoyer et al., "Massive Crowd on Assassin's Creed Unity: AI Recycling," Mar. 2, 2015, 55 pages.

Dick et al., "A Hexahedral Multigrid Approach for Simulating Cuts in Deformable Objects", IEEE Transactions on Visualization and Computer Graphics, vol. X, No. X, Jul. 2010, 16 pgs.

Diziol et al., "Robust Real-Time Deformation of Incompressible Surface Meshes", to appear inProceedings of the 2011 ACM SIGGRAPH/Eurographics Symposium on Computer Animation (2011), 10 pgs.

Dudash, Bryan. "Skinned instancing." NVidia white paper(2007).

Fikkan, Eirik. Incremental loading of terrain textures. MS thesis. Institutt for datateknikk og informasjonsvitenskap, 2013.

Geijtenbeek, T. et al., "Interactive Character Animation using Simulated Physics", Games and Virtual Worlds, Utrecht University, The Netherlands, The Eurographics Association 2011, 23 pgs.

Georgii et al., "Corotated Finite Elements Made Fast and Stable", Workshop in Virtual Reality Interaction and Physical Simulation VRIPHYS (2008), 9 pgs.

Habibie et al., "A Recurrent Variational Autoencoder for Human Motion Synthesis", 2017, in 12 pages.

Halder et al., "Image Color Transformation for Deuteranopia Patients using Daltonization", IOSR Journal of VLSI and Signal Processing (IOSR-JVSP) vol. 5, Issue 5, Ver. I (Sep.-Oct. 2015), pp. 15-20.

Han et al., "On-line Real-time Physics-based Predictive Motion Control with Balance Recovery," Eurographics, vol. 33(2), 2014, 10 pages.

Hernandez, Benjamin, et al. "Simulating and visualizing real-time crowds on GPU clusters." Computacion y Sistemas 18.4 (2014): 651-664.

Hu G, Chan CH, Yan F, Christmas W, Kittler J. Robust face recognition by an albedo based 3D morphable model. In Biometrics (IJCB), 2014 IEEE International Joint Conference on Sep. 29, 2014 (pp. 1-8). IEEE.

Hu Gousheng, Face Analysis using 3D Morphable Models, Ph.D. Thesis, University of Surrey, Apr. 2015, pp. 1-112.

Irving et al., "Invertible Finite Elements for Robust Simulation of Large Deformation", Eurographics/ACM SIGGRAPH Symposium on Computer Animation (2004), 11 pgs.

Kaufmann et al., "Flexible Simulation of Deformable Models Using Discontinuous Galerkin FEM", Oct. 1, 2008, 20 pgs.

Kavan et al., "Skinning with Dual Quaternions", 2007, 8 pgs.

Kim et al., "Long Range Attachments—A Method to Simulate Inextensible Clothing in Computer Games", Eurographics/ACM SIGGRAPH Symposium on Computer Animation (2012), 6 pgs.

Klein, Joseph. Rendering Textures Up Close in a 3D Environment Using Adaptive Micro-Texturing. Diss. Mills College, 2012.

Komura et al., "Animating reactive motion using momentum-based inverse kinematics," Computer Animation and Virtual Worlds, vol. 16, pp. 213-223, 2005, 11 pages.

(56) References Cited

OTHER PUBLICATIONS

Lee, Y. et al., "Motion Fields for Interactive Character Animation", University of Washington, Bungie, Adobe Systems, 8 pgs, obtained Mar. 20, 2015.
Levine, S. et al., "Continuous Character Control with Low-Dimensional Embeddings", Stanford University, University of Washington, 10 pgs, obtained Mar. 20, 2015.
Macklin et al., "Position Based Fluids", to appear in ACM TOG 32(4), 2013, 5 pgs.
McAdams et al., "Efficient Elasticity for Character Skinning with Contact and Collisions", 2011, 11 pgs.
McDonnell, Rachel, et al. "Clone attack! perception of crowd variety." ACM Transactions on Graphics (TOG). Vol. 27. No. 3. ACM, 2008.
Muller et al., "Meshless Deformations Based on Shape Matching", SIGGRAPH 2005, 29 pgs.
Muller et al., "Adding Physics to Animated Characters with Oriented Particles", Workshop on Virtual Reality Interaction and Physical Simulation VRIPHYS (2011), 10 pgs.
Muller et al., "Real Time Dynamic Fracture with Columetric Approximate Convex Decompositions", ACM Transactions of Graphics, Jul. 2013, 11 pgs.
Muller et al., "Position Based Dymanics", VRIPHYS 2006, Oct. 21, 2014, Computer Graphics, Korea University, 23 pgs.
Musse, Soraia Raupp, and Daniel Thalmann. "Hierarchical model for real time simulation of virtual human crowds." IEEE Transactions on Visualization and Computer Graphics 7.2 (2001): 152-164.
Nguyen et al., "Adaptive Dynamics With Hybrid Response," 2012, 4 pages.
O'Brien et al., "Graphical Modeling and Animation of Brittle Fracture", GVU Center and College of Computing, Georgia Institute of Technology, Reprinted from the Proceedings of ACM SIGGRAPH 99, 10 pgs, dated 1999.
Orin et al., "Centroidal dynamics of a humanoid robot," Auton Robot, vol. 35, pp. 161-176, 2013, 18 pages.
Parker et al., "Real-Time Deformation and Fracture in a Game Environment", Eurographics/ACM SIGGRAPH Symposium on Computer Animation (2009), 12 pgs.
Pelechano, Nuria, Jan M. Allbeck, and Norman I. Badler. "Controlling individual agents in high-density crowd simulation." Proceedings of the 2007 ACM SIGGRAPH/Eurographics symposium on Computer animation. Eurographics Association, 2007. APA.
Qiao, Fengchun, et al. "Geometry-contrastive gan for facial expression transfer." arXiv preprint arXiv:1802.01822 (2018). (Year: 2018).
Rivers et al., "FastLSM: Fast Lattice Shape Matching for Robust Real-Time Deformation", ACM Transactions on Graphics, vol. 26, No. 3, Article 82, Publication date: Jul. 2007, 6 pgs.
Ruiz, Sergio, et al. "Reducing memory requirements for diverse animated crowds." Proceedings of Motion on Games. ACM, 2013.
Rungjiratananon et al., "Elastic Rod Simulation by Chain Shape Matching withTwisting Effect" SIGGRAPH Asia 2010, Seoul, South Korea, Decemer 15-18, 2010, ISBN 978-1-4503-0439-9/10/0012, 2 pgs.
Seo et al., "Compression and Direct Manipulation of Complex Blendshape Models", In ACM Transactions on Graphics (TOG) Dec. 12, 2011 (vol. 30, No. 6, p. 164). ACM. (Year: 2011), 10 pgs.
Sifakis, Eftychios D., "FEM Simulations of 3D Deformable Solids: A Practioner's Guide to Theory, Discretization and Model Reduction. Part One: The Classical FEM Method and Discretization Methodology", SIGGRAPH 2012 Course, Version 1.0 [Jul. 10, 2012], 50 pgs.
Stomakhin et al., "Energetically Consistent Invertible Elasticity", Eurographics/ACM SIGGRAPH Symposium on Computer Animation (2012), 9 pgs.
Thalmann, Daniel, and Soraia Raupp Musse. "Crowd rendering." Crowd Simulation. Springer London, 2013. 195-227.
Thalmann, Daniel, and Soraia Raupp Musse. "Modeling of Populations." Crowd Simulation. Springer London, 2013. 31-80.
Treuille, A. et al., "Near-optimal Character Animation with Continuous Control", University of Washington, 2007, 7 pgs.
Ulicny, Branislav, and Daniel Thalmann. "Crowd simulation for interactive virtual environments and VR training systems." Computer Animation and Simulation 2001 (2001 ): 163-170.
Vaillant et al., "Implicit Skinning: Real-Time Skin Deformation with Contact Modeling", (2013) ACM Transactions on Graphics, vol. 32 (n° 4). pp. 1-11. ISSN 0730-0301, 12 pgs.
Vigueras, Guillermo, et al. "A distributed visualization system for crowd simulations." Integrated Computer-Aided Engineering 18.4 (2011 ): 349-363.
Wu et al., "Goal-Directed Stepping with Momentum Control," Eurographics/ ACM SIGGRAPH Symposium on Computer Animation, 2010, 6 pages.
Zhang, Jiangning, et al. "Freenet: Multi-identity face reenactment." Proceedings of the IEEE/CVF conference on computer vision and pattern recognition. 2020. (Year: 2020).
Olszewski, Kyle, et al. "Realistic Dynamic Facial Textures from a Single Image using GANs." Proceedings of the IEEE International Conference of Computer Vision. 2017, in 10 pages.
R. P. Prager, L. Troost, S. Bruggenjurgen, D. Melhart, G. Yannakakis and M. Preuss, "An Experiment on Game Facet Combination\," 2019, 2019 IEEE Conference on Games (CoG), London, UK, pp. 1-8, https://ieeexplore.ieee.org/stamp/stamp.jsp?tp=&arnumber=8848073 (Year: 2019).

\* cited by examiner

AUTOMATED SYSTEM FOR GENERATION OF FACIAL ANIMATION RIGS

TECHNICAL FIELD

The present disclosure relates to systems and techniques for generation of facial animation rig for virtual character models.

BACKGROUND

Electronic games are increasingly becoming more realistic due to an increase in available processing resources. The games can include rich, lifelike, characters that are created to follow complex scripts, and are placed in video games via computationally expensive animation processes. This increase in realism may allow for more realistic gameplay experiences. For example, elements that form an in-game world, such as characters, may be more realistically presented. In this example, the elements may be increasingly rendered at higher resolutions, with more detailed textures, with more detailed underlying meshes, and so on. While this added realism may be beneficial to an end-user of an electronic game, it may place a substantial burden on electronic game designers. As an example, electronic game designers may be required to create very rich, and detailed, models of character faces and expressions. As another example, electronic game designers may be required to create fluid, lifelike, expressions for each character within a game.

A character may be animated to emote, and in so doing the character's face may express disparate feelings while providing dialogue. For example, a character may express feelings of happiness, apprehension, fear, and so on. Generally, video game modelers are required to manipulate a 3D model of a character's face to arrive at each emotion. As an example, a video game modeler may modify the character's face to appear happy. This modification may stem from the video game modeler's utilization of software to create a 3D model of the character's face, and then adjust the 3D model until it conforms to the emotion required. However, each character's range of facial expressions are required to be modeled separately. That is, a video game modeler will have to uniquely adjust a 3D model of each character's face until the face arrives at each of defined facial expression. The process can result in a large amount of work which is not transferable between characters.

Additionally, an animator can create a facial animation rig that can be used to adjust the character's face after it has been modeled. The process of facial rigging is a complex process that is not easily transferable and can take a significant amount of development time, sometimes months of developer time to create a facial animation rig. For example, a modeler can create a happy face for an elderly character, and one or more variations that express slightly different emotions that are related to being happy (e.g., a bemused look). When the character is being animated, a video game animator may only be able to select from the happy face, or pre-configured variations, when animating a scene. If the developer wants to create facial expressions for a child, they will need to create a different facial rig and go through the entire process again. As the elderly person's facial rigging would not appropriately convey the character's facial expressions. Thus the process can be quite cumbersome to create facial animation riggings for characters within a game.

SUMMARY OF CERTAIN EMBODIMENTS

Particular embodiments of the subject matter described in this specification can be implemented so as to realize one or more of the following advantages. Utilizing the techniques described herein, realistic facial animations may be rapidly generated for character models configured for use in electronic games. As will be described, techniques may be employed to learn representations of distinct human faces. For example, a facial model may be defined, at least in part, based on positions of a multitude of features on the human face. Example features may include eyes, a nose, a mouth, ears, and so on. As may be appreciated, these features may be adjusted on a person to generate various expressions or perform various actions, such as speak, blink, and the like.

At present, techniques to generate facial animations and models for character models may rely upon designers generating and adjusting the character models to define different types of expressions. For example, to define smiling, a designer would need to define the positions of the features of the face of the model. In this example, the designer may upturn the position the corners of mouth, and so on. While this may allow for a smile to be generated, it may also involve a substantial burden on the designer.

In the present disclosure, techniques can be used to generate facial animation rigging based on real world expression data generated by humans and existing facial rigging systems. The facial animation rigging can be generated based on existing character models and/or real-world facial expression data that can be captured using a capture device. In such an embodiment, the capture device can be a standard 2D capture device such as a camera, a phone, or other device that can be used to capture still images and/or video data. The expression data can be pre-processed and configured so that it is in a format that is usable by the facial rig generation system to generate new facial animation rigs.

The techniques described herein therefore improve upon the functioning of prior software-based techniques to generate movement of in-game character models. As described above, prior techniques relied upon by designers to adjust positions of facial features on a skeleton underlying a character model. In contrast, the techniques described herein may allow for automated generation and adjustment of facial rigging systems. Advantageously, the automated adjustment of the facial rigging system allows for complicated rigging for animations to be quickly generated. In the present disclosure, techniques can be used to generate facial animation tools that are specific to input received for a real-world person. The facial rigging system can generate a facial rigging with an identity that corresponds to the input data provided.

In some aspects, the techniques described herein relate to a computer-implemented method including: accessing a first facial rig having a rig topology, a range of motion data of facial characteristics of the first facial rig, and calculated positional coefficients for the range of motion data, wherein the first facial rig has a first rig identity; receiving input scan data including an input facial model and a plurality of facial expressions of facial characteristics of the input model, wherein the input facial model uses the topology of the first facial rig, wherein the input facial model has a facial model identity; calculating coefficients of the input facial model for each of the plurality of facial expressions; calculating frequency separation for a defined range of the motion data of the first facial rig resulting in first high frequency data and first low frequency data; calculating frequency separation on each of the plurality of facial expressions of the input model resulting in second high frequency data and second low frequency data; matching portions of the second low frequency data to corresponding portions of the first low frequency data; identifying second high frequency data corresponding to the matched first low frequency data; generating a mesh based on the second high frequency data; and outputting a second facial rig based on the mesh, wherein the second facial rig has a second rig identity that corresponds to the facial model identity of the input scan data.

In some aspects, the techniques described herein relate to a computer-implemented method, wherein the input facial model is a three dimensional model.

In some aspects, the techniques described herein relate to a computer-implemented method, wherein the three dimensional model is based on two dimensional input data of a person.

In some aspects, the techniques described herein relate to a computer-implemented method, wherein the input facial model is composed of a plurality of blendshapes.

In some aspects, the techniques described herein relate to a computer-implemented method further including dividing the blendshapes into regions and calculating coefficients for each region in each of the plurality of expressions.

In some aspects, the techniques described herein relate to a computer-implemented method, wherein the coefficients correspond to displacement of the input model relative to a neutral state for each region of the input model.

In some aspects, the techniques described herein relate to a computer-implemented method, wherein the plurality of facial expressions of facial characteristics of the input model are a sequence of animations.

In some aspects, the techniques described herein relate to a computer-implemented method further including decomposing input scan data into direction and magnitude.

In some aspects, the techniques described herein relate to a computer-implemented method further including combining the direction and magnitude to generate the second facial rig.

In some aspects, the techniques described herein relate to a computer-implemented method further including performing principle component analysis on input scan prior to calculating frequency separation.

In some aspects, the techniques described herein relate to a computer-implemented method further including calculating a final mesh deformation of the plurality of expressions using matrix multiplication based at least in part on the coefficients of the input facial model.

In some aspects, the techniques described herein relate to a computer-implemented method, wherein the frequency separation is calculated using a Laplacian filter.

In some aspects, the techniques described herein relate to a system including one or more processors and non-transitory computer storage media storing instructions that when executed by the one or more processors, cause the one or more processors to perform operations including: accessing a first facial rig having a rig topology, a range of motion data of facial characteristics of the first facial rig, and calculated positional coefficients for the range of motion data, wherein the first facial rig has a first rig identity; receiving input scan data including an input facial model and a plurality of facial expressions of facial characteristics of the input model, wherein the input facial model uses the topology of the first facial rig, wherein the input facial model has a facial model identity; calculating coefficients of the input facial model for each of the plurality of facial expressions; calculating frequency separation for a defined range of the motion data of the first facial rig resulting in first high frequency data and first low frequency data; calculating frequency separation on each of the plurality of facial expressions of the input model resulting in second high frequency data and second low frequency data; matching portions of the second low frequency data to corresponding portions of the first low frequency data; identifying second high frequency data corresponding to the matched first low frequency data; generating a mesh based on the second high frequency data; and outputting a second facial rig based on the mesh, wherein the second facial rig has a second rig identity that corresponds to the facial model identity of input scan data.

In some aspects, the techniques described herein relate to a system, wherein the input facial model is composed of a plurality of blendshapes.

In some aspects, the techniques described herein relate to a system further including dividing the blendshapes into regions and calculating coefficients for each region in each of the plurality of expressions.

In some aspects, the techniques described herein relate to a system, wherein the coefficients correspond to displacement of the input model relative to a neutral state for each region of the input model.

In some aspects, the techniques described herein relate to a system further including decomposing input scan data into direction and magnitude.

In some aspects, the techniques described herein relate to a system further including combining the direction and magnitude to generate the second facial rig.

In some aspects, the techniques described herein relate to a system further including calculating a final mesh deformation of the plurality of expressions using matrix multiplication based at least in part on the coefficients of the input facial model.

In some aspects, the techniques described herein relate to a non-transitory computer storage medium storing instructions that when executed by one or more processors, cause the one or more processors to perform operations including: accessing a first facial rig having a rig topology, a range of motion data of facial characteristics of the first facial rig, and calculated positional coefficients for the range of motion data, wherein the first facial rig has a first rig identity; receiving input scan data including an input facial model and a plurality of facial expressions of facial characteristics of the input model, wherein the input facial model uses the topology of the first facial rig, wherein the input facial model has a facial model identity; calculating coefficients of the input facial model for each of the plurality of facial expressions; calculating frequency separation for a defined range of the motion data of the first facial rig resulting in first high frequency data and first low frequency data; calculating frequency separation on each of the plurality of facial expressions of the input model resulting in second high frequency data and second low frequency data; matching portions of the second low frequency data to corresponding portions of the first low frequency data; identifying second high frequency data corresponding to the matched first low frequency data; generating a mesh based on the second high frequency data; and outputting a second facial rig based on the mesh, wherein the second facial rig has a second rig identity that corresponds to the facial model identity of input scan data.

The systems, methods, and devices of this disclosure each have several innovative aspects, no single one of which is solely responsible for all of the desirable attributes disclosed herein.

Although certain embodiments and examples are disclosed herein, inventive subject matter extends beyond the examples in the specifically disclosed embodiments to other alternative embodiments and/or uses, and to modifications and equivalents thereof.

The details, including optional details, of one or more embodiments of the subject matter of this specification are set forth in the accompanying drawings and the description below. Other optional features, aspects, and advantages of the subject matter will become apparent from the description, the drawings, and the claims.

BRIEF DESCRIPTION OF THE DRAWINGS

Throughout the drawings, reference numbers are re-used to indicate correspondence between referenced elements. The drawings are provided to illustrate embodiments of the subject matter described herein and not to limit the scope thereof.

Like reference numbers and designations in the various drawings indicate like elements.

DETAILED DESCRIPTION

Overview

Figure 1:
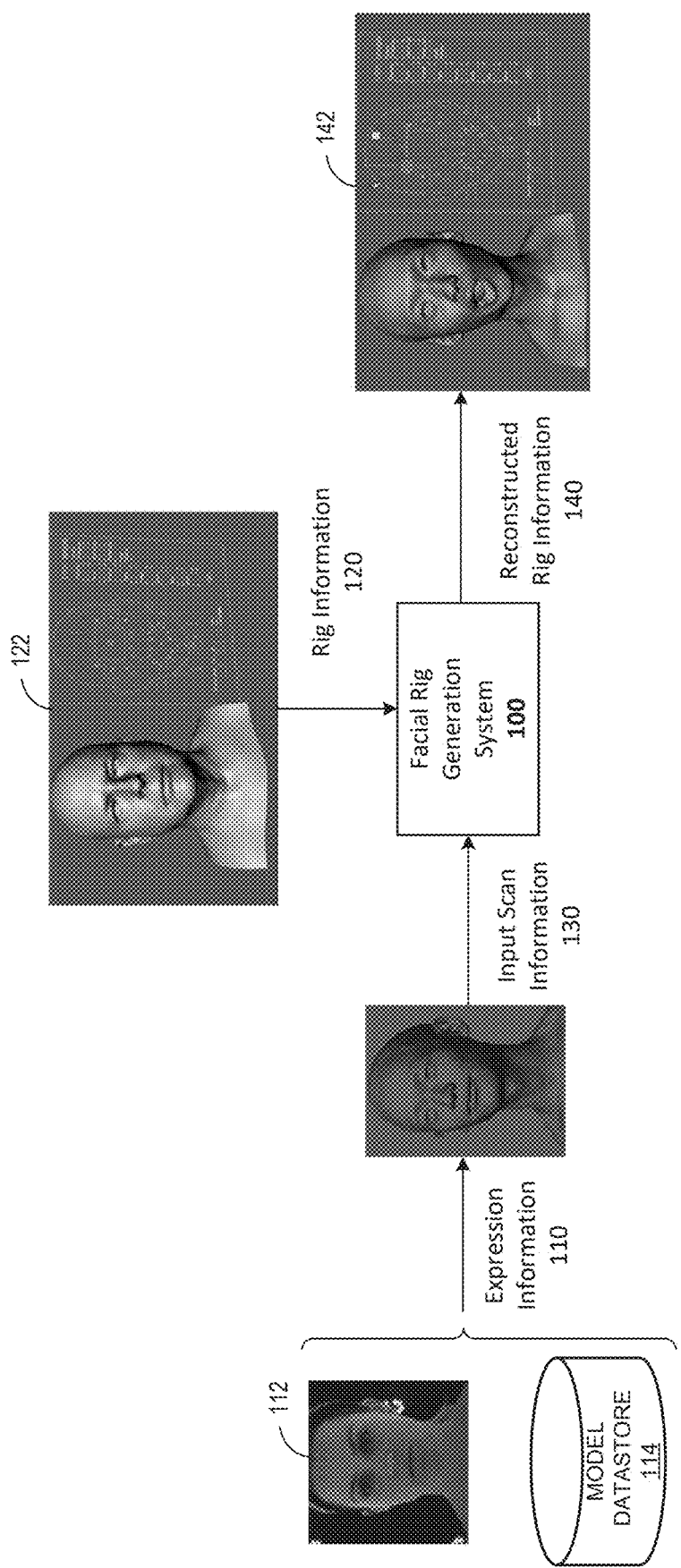
FIG. 1 illustrates a block diagram of an example rig generation system.

This specification describes, among other things, technical improvements with respect to generation of facial expressions, facial riggings, and models for characters configured for use in electronic games. As will be described a system described herein (e.g., the rig generation system) may generate a facial animation rig (also referred to as a facial rig or rig) that can be used to generate realistic facial expressions based on analyzing data captured from real-world persons. Advantageously, the system may allow for substantially automated facial rig generation. While electronic games are described, it may be appreciated that the techniques described herein may be applied generally to generation of facial rigs for use with generation of facial expressions and features of character models. For example, animated content (e.g., TV shows, movies) may employ the techniques described herein.

The present disclosure provides a system for automating the process of facial rigging for new virtual characters. A facial animation rig is used by animators to generate facial expressions for a virtual character. The facial rig can generate facial expressions that correspond to a specific person. The process of generating a facial rig can be referred to as facial rigging and can be a laborious process for developers which can take a significant amount of time. Facial rigging is the process of adding controls to a face for animating facial expressions. These controls are commonly bound to either deformers or blendshapes, both of which modify the face's shape, scale, or orientation. The process includes creating the animation controls for a facial model and the animator's interface to those controls. The controls can provide for changing the weighting of feature points on the face in order to control the facial expressions, manually or automatically. These controls can be used to animate the facial expressions in accordance with motion data.

Facial expressions for an in-game character may be defined, at least in part, based on distinct positions of the facial features of the in-game character. The distinct positions, for example, may be blended together to generate the expression. As an example, each expression may represent a discrete sample of an animation sequence to be performed by the in-game character. Thus, if motion is to depict talking, each expression may represent a snapshot of the facial features during speaking. Even though each model can be configured to execute the same general facial expressions (e.g., smile, frown, etc.), each person has a unique way of implementing their own expression. As an example, the system may obtain a multitude of expressions of real-life persons. For example, there may be thousands, hundreds of thousands, and so on, obtained expressions. These expressions may, in some embodiments, be obtained from video of the real-life persons. Certain expressions may represent discrete snapshots of a real-life person.

Facial expressions may be provided as an input to the system. For example, observable features of the expression may be provided as an input. Example observable features may include positions of a facial model based on a real-life person (e.g., three-dimensional coordinates). These positions are referred to herein as facial features and may represent portions of a face or facial model which can move or be manipulated (e.g., eyes, nose, mouth, and so on).

In some embodiments, the techniques described herein can be used during the development process of the electronic game. In some embodiments, the techniques described herein may be performed during in-game gameplay of an electronic game. For example, a user may wish that an in-game character within an electronic game may have one or more expressions provided by the user. In this example, the user may provide video footage of the expression for the in-game character to mimic. The electronic game may thus generate a facial rig that is capable of generating a realistic sequence of expressions that correspond to the user's input.

In some embodiments, the user may provide an image of a face to be used for an in-game character to be used within the electronic game. For example, the present system can generate texture map(s) and meshes for generating a facial model for use as an in-game character within the electronic game.

Facial Rigging Generation System Overview

FIG. 1 illustrates a block diagram of an example facial rig generation system 100. In the illustrated embodiment, the facial rig generation system 100 is configured to receive rig information 120, and input scan information 130, and generate reconstructed rig identity information 140. The input scan information can be generated based on expression information 110. The facial rig generation system 100 may, in some embodiments, be a system of one or more computers, one or more virtual machines executing on a system of one or more computers, and so on. In some embodiments, the facial rig generation system 100 may be implemented as a module, or software (e.g., an application), which may execute on a user device (e.g., a laptop, tablet, console gaming system, and so on).

Expression Information

The expression information 110 may be provided from capture data 112 and/or a model datastore 114. One expression 112 in illustrated as being included in the expression information 110. While only one expression is illustrated, it may be appreciated that thousands, hundreds of thousands, millions, and so on, expressions may be provided as input to the facial rig generation system 100. The expression information 110 may be obtained via analyzing images and/or video of real-life persons. For example, it can be based on discrete images and/or 2D videos of faces preforming a predefined range of motions and then converted to an acceptable format for use with the facial rig generation system 100.

In this example, each frame of the video may depict one or more expressions. As another example, motion capture information may be obtained from a capture studio. In this example, a person may be placed in a light room where multiple cameras are configured to synchronize the capture of facial data from all angles.

Each image and/or frame of video may be analyzed to identify features to be input into the facial rig generation system 100. For example, the features may include locations of facial features. Example facial features may include a nose, cheeks, eyes, eyebrows, the forehead, ears, mouth, teeth, and so on. Thus, a facial feature may represent a portion of real-life person which is capable of movement or otherwise controlled by the real-life person. The locations of the facial features may be defined, in some embodiments, as two- or three-dimensional coordinates. For example, a coordinate reference frame may be defined. Each image and/or frame of video may be analyzed to map facial features of a real-life person onto the coordinate reference frame. As an example, movement of the eyes or mouth in a video clip may be analyzed to determine relative movement of each of the facial features. This relative movement may be translated to the coordinate reference frame for use by the facial rig generation system 100. In some embodiments, deep learning techniques (e.g., convolutional neural networks) may be utilized to extract locations of the facial features. For example, a deep learning model may be trained to identify specific facial features depicted in an image or video frame.

Similarly, motion capture information may be analyzed to identify features to be input into the facial rig generation system 100. Motion capture information may, in some embodiments, allow for rapid importation of locations of facial features on a real-life person. For example, the motion capture information may indicate locations of the person's facial features at discrete times. Each discrete time may be defined as a particular expression of the person. Thus, the location of the facial features may be identified for each expression.

The expression 112 is graphically depicted as representing the capture data for a particular expression. Though only a single image is illustrated, the capture data can be representative of video data that illustrates a range of expressions generated by the depicted person. Additionally, the capture data illustrated in 112 can be preprocessed in order to isolate the face and expression of the person. The image or video can be manipulated so that the face of the person is positioned in substantially the same position within the frame. The expression data can be manipulated, such as by scaling, cropping, and converting the color format of the capture data.

The expression 112 is graphically depicted as representing a particular expression, though it is generally indicative of a video including a plurality of expressions. In some embodiments, location information for facial features may be provided as an input to the facial rig generation system 100. For example, the location information may be combined into a data structure, such as a vector or matrix, and define dimensional locations of the facial features. In some embodiments, expression information 110 including a multitude of expressions (e.g., hundreds, thousands, and so on) may be provided to the facial rig generation system 100.

Rig Information

The rig information 120 includes a production facial animation rig that has previously been generated. The production facial rig is an operational rig with controls for animating facial expressions of a face having a defined identity. These controls are commonly bound to either deformers or blendshapes having a defined topology. The animation controls for the facial model can provide for changing the weighting of feature points on the face in order to control the facial expressions, manually or automatically. These controls can be used to animate the facial expressions in accordance with motion data. The rig information 120 also includes range of motion (ROM) data, which includes a defined set of ROM animation applied to the facial rig. Advantageously, the ROM data can include animations that encompasses substantially all of the facial movements and emotes capable by the production facial rig.

The rig information 120 can include positional data for each of the facial characteristics for all of the ROM data. The positional data can be provided for each frame of the ROM data. Such that each frame and it's corresponding positional information can include calculated positional data. The calculated positional data can include calculated positional coefficients. This data can be in the form of calculated coefficients for each blendshape. In some instances, the blendshapes can be converted to UV coordinates and divided into regions (e.g., 16×16). The coefficients can be calculated for each region within each frame of the ROM data. The rig information 120 is used as the basis for generating the reconstructed rig information 140 using the input scan information 130.

Figure 3:
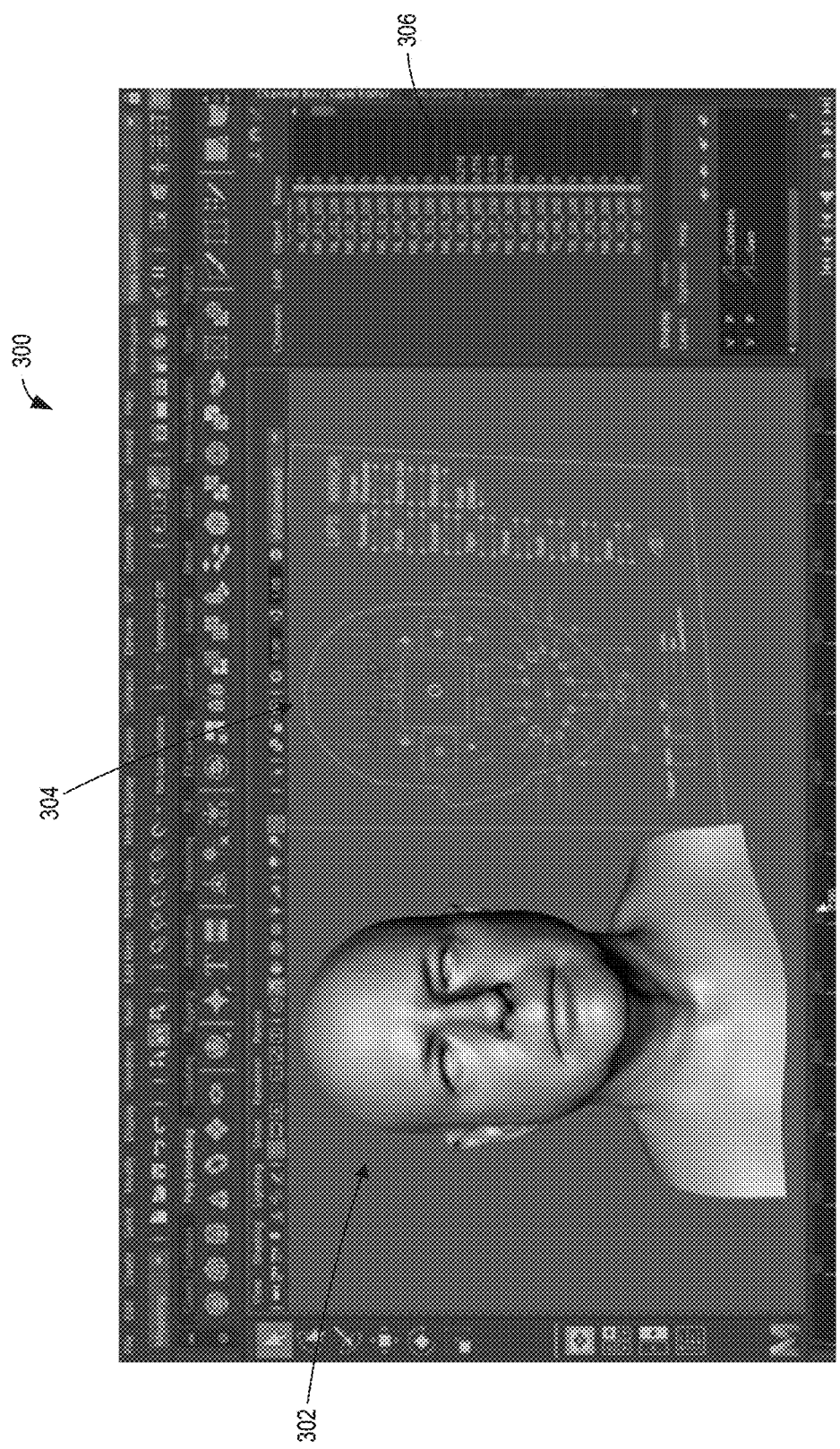
FIG. 3 illustrates an example rig system for a facial model.

With additional reference to FIG. 3, an example of a facial animation rig 300 is illustrated. The facial animation rig includes a three-dimensional facial model 302. Controls 304 for manipulating the positional features of the facial model are illustrated. Each of the controls provides for control of specific facial characteristics of the facial model. The controls define the minimums and maximums, relationships, correctives, and rules for which the various controls can be manipulated to change the expression of the facial model. Section 306 illustrates calculated coefficients for the positions of regions of the face. In the illustrated embodiment, the calculated coefficients can be determined relative to a neutral state of the facial model. Displacement from the neutral state can be represented by a value that deviates from zero.

Input Scan Information

Figure 2:
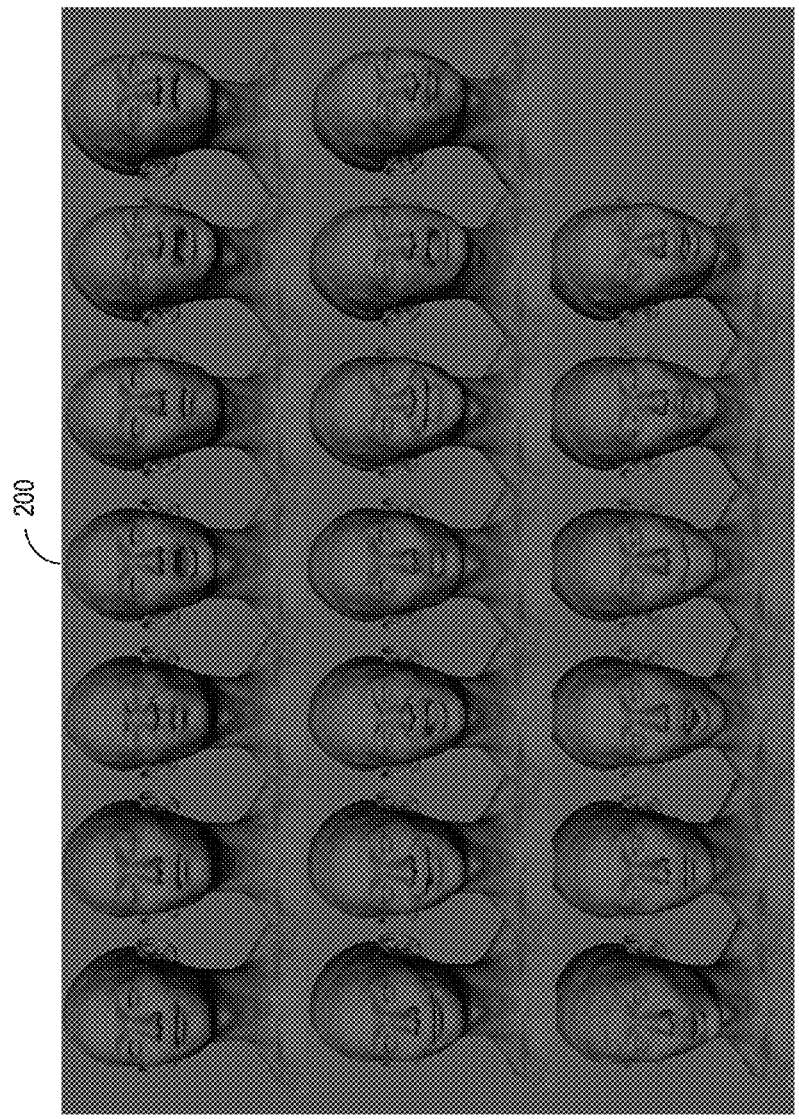
FIG. 2 illustrates examples of input scan information for a rig generation engine.

The expression information 110 can be processed so that it is in a format that is usable by facial rig generation system 100. The expression information 110 can be in various forms that can go through various processing steps to convert it from two-dimensional data to a three-dimensional model. Advantageously, the expression information will have a sufficient number of expressions that can be used by the facial rig generation system 100 to generate the reconstructed rig information 140. The expressions can be in the form of a static poses and/or a continuous sequence of inputs (e.g., animations). An example of a series of static poses 200 are illustrated in FIG. 2.

The input scan information 130 that is provided to the facial rig generation system 100 based on the expression data 110 is in format that uses the same topology as the production rig 122. The expression information is converted to a 3D model, aligned, and pre-stabilized for use with the production rig topology. The input scan information 130 can be generated manually or automatically. The expressions can be static scans representing discreet expressions that have been generated based on the expression information, such as capture data received during motion capture or from a user. The input scan information 130 can include positional data for the expression data. The positional data can be provided for each discreet expression and/or frame of animation data. Such that each frame/expression and it's corresponding positional information can include calculated positional data. This data can be in the form of calculated coefficients for each blendshape. In some instances, the blendshapes can be converted to UV coordinates and divided into regions (e.g., 16×16). The coefficients can be calculated for each region within each frame of the ROM data.

The conversion from the original source data of the expression information is performed prior to proving the input scan information to the facial rig generation system 100. The input scan information includes a plurality of expressions, whether they are discrete or continuous. The order of the expression is not of important, but rather it is advantageous that the shapes of the expressions are well varied in order to determine an adequate analysis of the face associated with the input scan information. The input scan information can be provided as input to the facial rig generation system 100 after the preprocessing is complete.

Reconstructed Rig Information

The facial rig generation system 100 can use the input scan information to output a reconstructed rig information 140, which can include a new facial rig 142 that corresponds to the input scan information. By using the production rig 122, the system can utilize frequency matching between the rig information 120 and the input scan information 130 to generate a new identity for the rig that corresponds to the facial animation characteristics of the input scan data.

Facial animation characteristics are different for each individual and each facial rig has a specific identity. The identity of a rig allows the developer to generate facial actions that are specific to the identity associated with the rig. By using this process for facial rigging, particular differences between the production rig 122 and the user scan information 130 can be analyzed and a new or reconstructed facial rig can be generated. The generated rig can be used by animators when animating and developing characters for a game.

As discussed herein, the facial rigs have the same general functionality in that the controls are manipulated into facial expressions, and the blendshapes of the facial rig are manipulated into an expression or animation. Generally, each person emotes differently. For example, each person has a slightly different smile, the position of the mouth, eyes, and other facial characteristics are different even for the same type of expression. By automating the development of facial animation rigs, the process can be reduced from a period of months to hours. The facial rig generation system 100 provides developers with the tools to automate the generation of facial rigs having a specific identity for any character within a game.

Rig Generation Process

Figure 4:
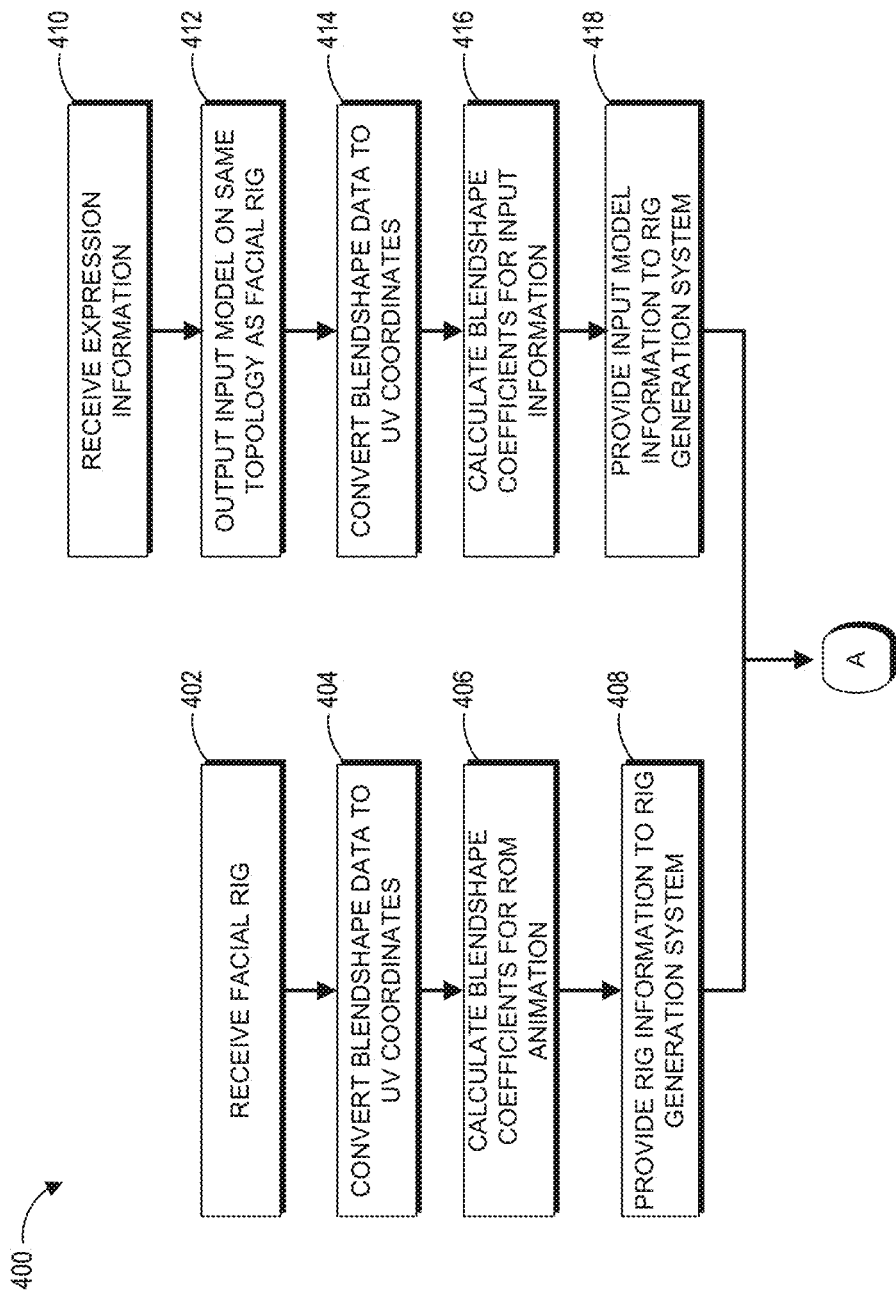
FIG. 4 is a flowchart of an example process for preprocessing input model information for use with the rig generation engine.
Figure 5:
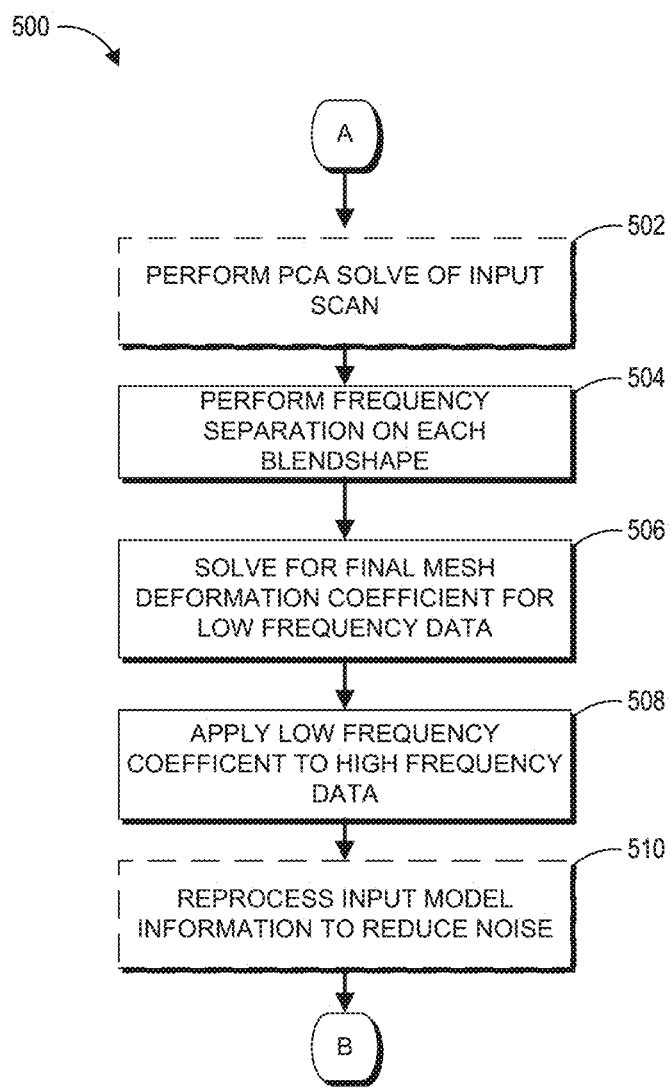
FIG. 5 illustrates a flow chart of an example process for generating a rig using the rig generation system.
Figure 7:
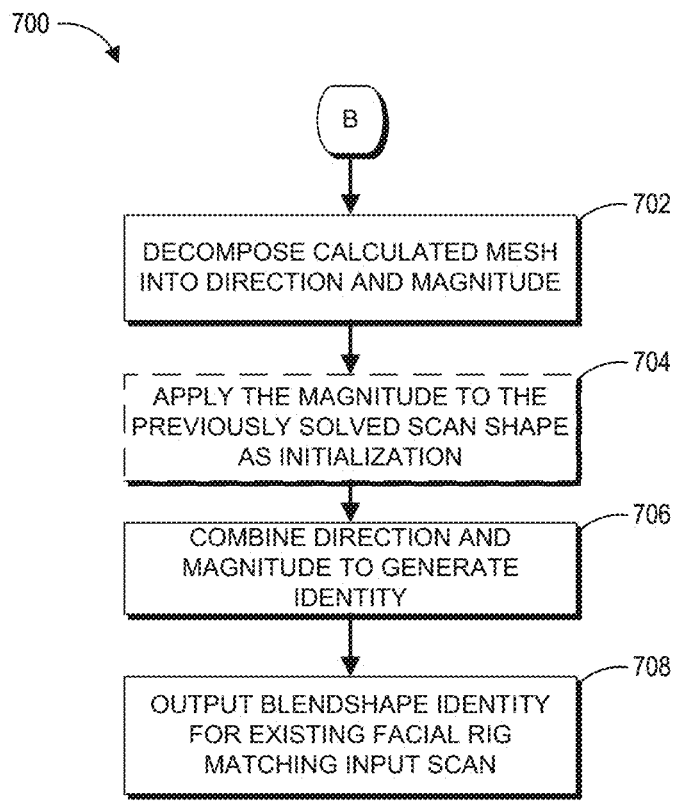
FIG. 7 illustrates an example outputs of filters used by the rig generation system.

FIGS. 4, 5, and 7 illustrate example processes used to generate a reconstructed facial rig 140 based on the expression information 110, rig information 120, and input scan information 130. FIG. 4 is directed to processing the expression information and generating input scan information that can be used by the facial rig generation system 100 to generate the new facial rig. FIGS. 5 and 7 provide example processes executed by the facial rig generation system 100 for generating the new facial rig based on the input scan information associated with an input identity.

Advantageously, once a facial rig is generated for an input identity, such as a person A, the facial rig can be used to generate new expressions based on inputs that substantially correspond to how person A would make the expressions based on the input data. Greater amounts of input data will increase the correlation between input scan expressions (e.g., person A expressions) and the resulting expressions of the facial rig. Additionally, the new facial rig can be used with different models and the same identity of expressions can be output. For example, a facial rig generated based on how an elderly man would emote, could be replaced with the model of young girl and the facial characteristics of the model can then be moved based on the identity of the elderly man when emoting. These expressions may advantageously represent realistic expressions of persons. For example, the elderly man facial rig can be used with other models of a similar archetype (e.g., elderly men).

Example Flowchart—Processing Input Data

FIG. 4 is a flowchart of an example process 400 for processing expression data for use with the facial rig generation system 100. For convenience, the process 400 will be described as being performed by a system of one or more computers (e.g., the facial rig generation system 100). Blocks 402-408 relate to the rig information 120 and blocks 410-418 relate to the expression information 110 and the input scan information 130.

At block 402, the system receives a facial rig for use as a basis for the facial rig generation system 100. The facial rig can be referred to as a production facial rig. The production facial rig is an operational rig with controls for animating facial expressions of a face having a defined identity. The controls of the facial rig allow for the control of blendshapes of the facial model. The rig information 120 also includes a defined set of range of motion (ROM) animation applied to the facial rig. Advantageously, the ROM data can include animations that encompasses substantially all of the facial movements and emotes capable by the production facial rig.

At block 404, the system can convert the blendshape data to a UV coordinate system. The UV coordinate system may be used for mapping textures to the model and can be beneficial for the animation process. The data on UV coordinate system can be divided into regions of a defined size (e.g., 16×16).

At block 406, the system can calculate blendshape coefficients for each frame of the ROM animation. The rig information 120 can include positional data for each of the facial characteristics for all of the ROM data. The positional data can be provided for each frame of the ROM data. Such that each frame and it's corresponding positional information can include calculated positional data. This data can be in the form of calculated coefficients for each blendshape. The coefficients can be calculated for each region of the model. Example coefficients are illustrated in section 306 of the embodiment of the facial rig illustrated in FIG. 3. the calculated coefficients can be determined relative to a neutral state of the facial model. Deviation from the neutral state can be represented by a value different than zero.

At block 408, the production facial rig and ROM are loaded into the facial rig generation system 100 for future processing. The facial rig generation system 100 can be facial rig agnostic, such that any type of facial rig can be loaded into the facial rig generation system 100. The output of the facial rig generation system 100 will depend on the type of production facial rig loaded into the facial rig generation system 100. As the analysis will be computed based the production rig utilized by the facial rig generation system 100. As will be further described with respect to blocks 410-418, the facial rig is used as the topology basis for the new input data.

At block 410, the system can receive expression information that is used as the basis for the input scan data. The expression information 110 may be obtained via analyzing images and/or video of real-life persons. The expression information 110 may be provided from capture data 112, a model datastore 114, and/or another source. The expression information 110 can be based on discrete images and/or videos (2D or 3D) of faces preforming a predefined range of motions. Advantageously, the expression information will have a sufficient number of expressions that can be used by the system to generate the reconstructed rig information 140.

At block 412, the system generates or otherwise outputs an input model on the same topology as the facial rig. The expression information 110 can be processed so that it is in a format that is usable by facial rig generation system 100. The expression information 110 can be in various forms that can go through various processing steps to convert it from two-dimensional data to a three-dimensional model. The input scan information 130 that is provided to the facial rig generation system 100 based on the expression data 110 is in format that uses the same topology as the production rig 122. The expression information is converted to a 3D model, aligned, and pre-stabilized for use with the production rig topology.

At block 414, the system can optionally convert the blendshape data to a UV coordinate system. The UV coordinate system may be used for mapping textures to the model and is beneficial for the animation process as a whole. The data on UV coordinate system can be divided into regions of a defined size (e.g., 16×16).

At block 416, the system can calculate blendshape coefficients for each frame of the of the input information (discreet or continuous). The system can calculate coefficients for each blendshape of model. The coefficients can be calculated for each region of the model. The calculated coefficients can be determined relative to a neutral state of the facial model. Deviation from the neutral state can be represented by a value different than zero. The coefficients can be calculated for each region in every frame of the input data.

At block 418, the input model information is provided to the facial rig generation system 100 for generation of a new facial rig that corresponds to the expression information.

Example Flowchart—Frequency Separation

FIG. 5 is a flowchart of an example process 500 for performing a frequency separation subprocess that can be executed to generate a facial rig. For convenience, the process 500 will be described as being performed by a system of one or more computers (e.g., the facial rig generation system 100).

At block 502, optionally, the system can perform a principle component analysis (PCA) of the input scan information. The PCA can be used when the dataset is too large and needs to be reduced in order to efficiently execute the process. For example, in instances where the input model data is too big to fit in memory, such as may be the case with large animation sequences.

Figure 6:
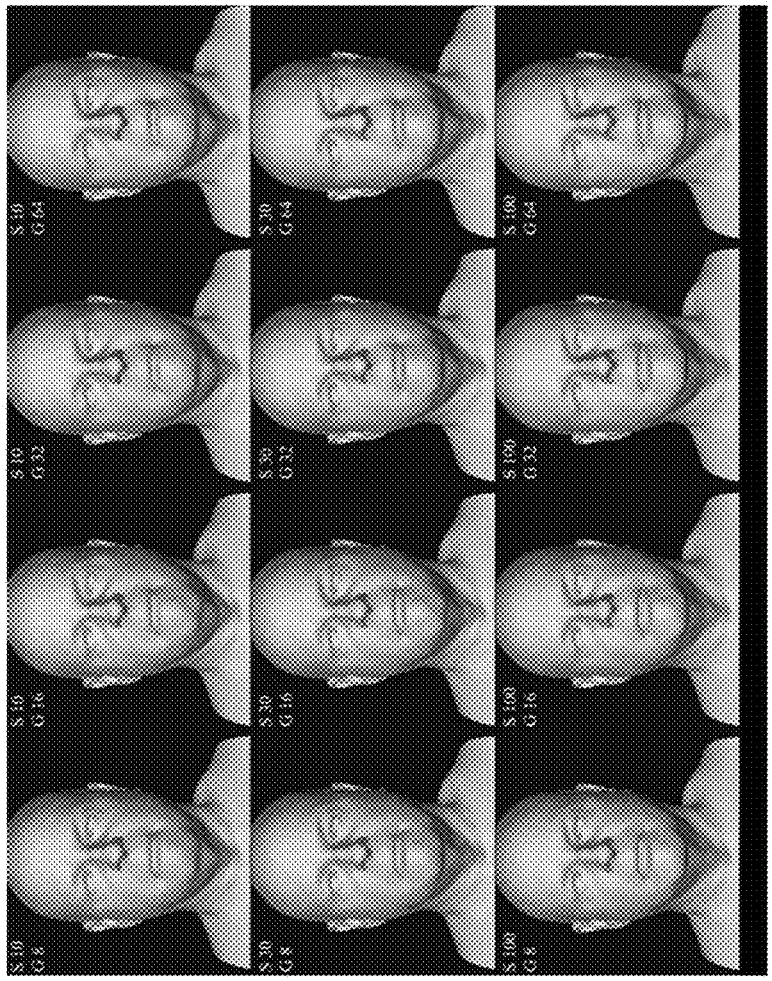
FIG. 6 illustrates another flow chart of an example process for generating a rig using the rig generation system.
Figure 6:
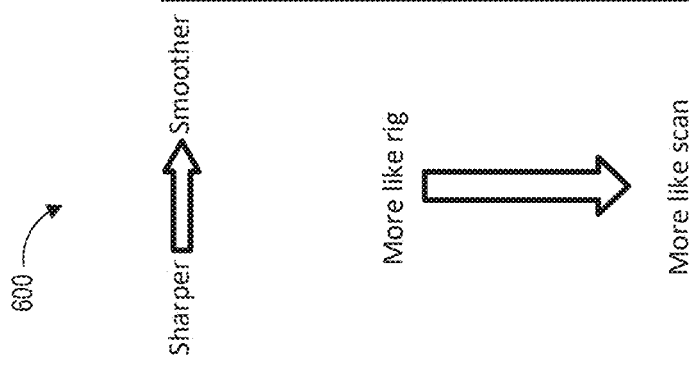

At block 504, the system performs a frequency separation on each region. The frequency separation analysis can separate high frequency and low frequency data for each region. The frequency separation is performed on the production rig blendshapes and the input model blendshapes. The strength of the frequency separation can be adjusted based on various considerations, such as whether the output should be more like the scan or the rig, whether the output should be sharper or smoother, and/or other considerations. An example of the effects of different filter settings on a sample output is illustrated in FIG. 6. A Laplacian filter may be used for the frequency separation.

At block 506, the system solves a mesh deformation coefficient for the low frequency data. A linear least square solve can be performed for each region. In instances when PCA is used to for the input data, a projection on the data can be performed. The solve is performed on the low frequency data for the production rig and the input model data in order to calculate the mesh deformation coefficients. For similar expressions, coefficients of lower frequency data can be similar between the production rig and the input model data. This allows the system to essentially map the low frequency coefficients of the input scan data onto the low frequency coefficients of the production rig data.

At block 508, the system applies the calculated low frequency coefficient to the high frequency data. The low frequency coefficients of the input scan data can be mapped to the low frequency coefficients of the production rig. Then the high frequency data can be used to generate a resulting mesh.

At block 510, optionally, the input scan data can be interated upon to reduce the noise of the data. For example, the input scan data can be projected onto itself.

FIG. 6 illustrates an example 600 of the effects of the filter being used to analyze the data. Depending on the settings of the filter, the output for the model can be configured to be closer to the production rig or closer to the input scan data. Additionally, aspects of the filter can determine whether the output is smoother or sharper.

Example Flowchart—Optimization

FIG. 7 is a flowchart of an example process 700 for performing an optimization subprocess that can be executed to generate a facial rig. For convenience, the process 700 will be described as being performed by a system of one or more computers (e.g., the facial rig generation system 100). The objective of the second subprocess is to optimize the result generated from the first subprocess to the production rig shape.

At block 702, the system decomposes the calculated mesh for the input scan data into a direction and a magnitude. This provides for the ability to solve and weight each component differently.

At block 704, optionally, the system can apply the magnitude from the production rig shape to the calculated mesh as initialization.

At block 706, the direction and the magnitude are combined to generate an identity for the new facial rig. The direction can be the heavier weighted component in the solve and can be optimized more freely. The magnitude is set to converge slower since the goal is to maintain roughly the same region control of the production rig. For example, to avoid issues where the eyes are closing but another non-connected region such as the mouth is moving.

In one embodiment, the direction and magnitude can be optimized using the following algorithm:

$$y = \text{sum}\{(\text{Blendshape} * \text{Magnitude}) * \text{coef}\}$$

At block 708, the system can generate and output facial rig identity that corresponds to the input scan information. The output by the facial rig generation system 100 can be the blendshape of the model and corresponding solved animation based on the input scan corresponding to a new identity. The system does not change the rig logic used for controlling the facial rig.

Computing System

Figure 8:
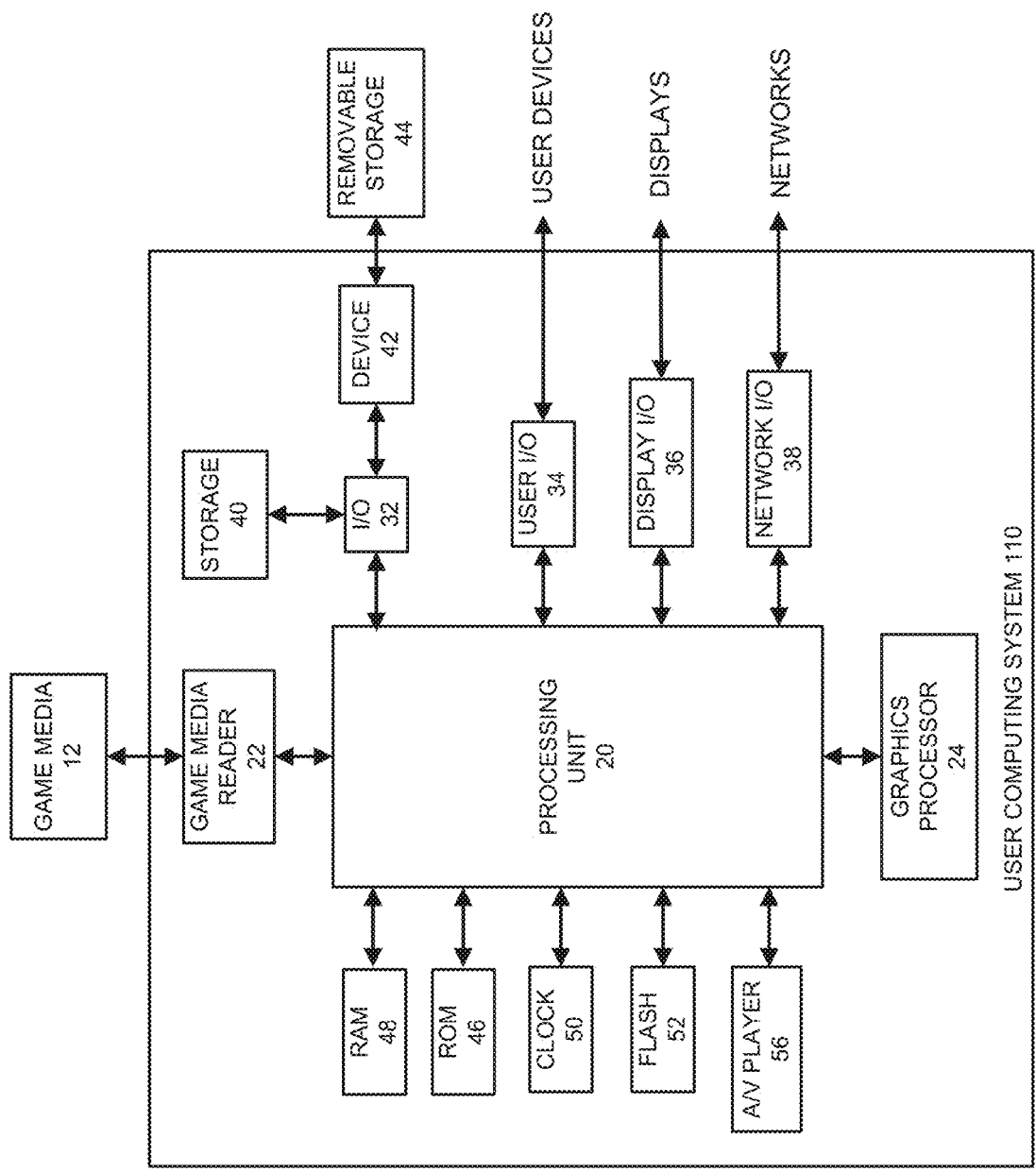
FIG. 8 illustrates an embodiment of computing device according to the present disclosure.

FIG. 8 illustrates an embodiment of computing device 10 according to the present disclosure. Other variations of the computing device 10 may be substituted for the examples explicitly presented herein, such as removing or adding components to the computing device 10. The computing device 10 may include a game device, a smart phone, a tablet, a personal computer, a laptop, a smart television, a car console display, a server, and the like. As shown, the computing device 10 includes a processing unit 20 that interacts with other components of the computing device 10 and also external components to computing device 10. A media reader 22 is included that communicates with media 12. The media reader 22 may be an optical disc reader capable of reading optical discs, such as CD-ROM or DVDs, or any other type of reader that can receive and read data from game media 12. One or more of the computing devices may be used to implement one or more of the systems disclosed herein.

Computing device 10 may include a separate graphics processor 24. In some cases, the graphics processor 24 may be built into the processing unit 20. In some such cases, the graphics processor 24 may share Random Access Memory (RAM) with the processing unit 20. Alternatively, or in addition, the computing device 10 may include a discrete graphics processor 24 that is separate from the processing unit 20. In some such cases, the graphics processor 24 may have separate RAM from the processing unit 20. Computing device 10 might be a handheld video game device, a dedicated game console computing system, a general-purpose laptop or desktop computer, a smart phone, a tablet, a car console, or other suitable system.

Computing device 10 also includes various components for enabling input/output, such as an I/O 32, a user I/O 34, a display I/O 36, and a network I/O 38. I/O 32 interacts with storage element 40 and, through a device 42, removable storage media 44 in order to provide storage for computing device 10. Processing unit 20 can communicate through I/O 32 to store data, such as game state data and any shared data files. In addition to storage 40 and removable storage media 44, computing device 10 is also shown including range of motion (Read-Only Memory) 46 and RAM 48. RAM 48 may be used for data that is accessed frequently.

User I/O 34 is used to send and receive commands between processing unit 20 and user devices, such as game controllers. In some embodiments, the user I/O can include a touchscreen inputs. The touchscreen can be capacitive touchscreen, a resistive touchscreen, or other type of touchscreen technology that is configured to receive user input through tactile inputs from the user. Display I/O 36 provides input/output functions that are used to display images from the game being played. Network I/O 38 is used for input/output functions for a network. Network I/O 38 may be used during execution of a game.

Display output signals produced by display I/O 36 comprising signals for displaying visual content produced by computing device 10 on a display device, such as graphics, user interfaces, video, and/or other visual content. Computing device 10 may comprise one or more integrated displays configured to receive display output signals produced by display I/O 36. According to some embodiments, display output signals produced by display I/O 36 may also be output to one or more display devices external to computing device 10, such a display 16.

The computing device 10 can also include other features that may be used with a game, such as a clock 50, flash memory 52, and other components. An audio/video player 56 might also be used to play a video sequence, such as a movie. It should be understood that other components may be provided in computing device 10 and that a person skilled in the art will appreciate other variations of computing device 10.

Program code can be stored in range of motion 46, RAM 48 or storage 40 (which might comprise hard disk, other magnetic storage, optical storage, other non-volatile storage or a combination or variation of these). Part of the program code can be stored in range of motion that is programmable (ROM, PROM, EPROM, EEPROM, and so forth), part of the program code can be stored in storage 40, and/or on removable media such as game media 12 (which can be a CD-ROM, cartridge, memory chip or the like, or obtained over a network or other electronic channel as needed). In general, program code can be found embodied in a tangible non-transitory signal-bearing medium.

Random access memory (RAM) 48 (and possibly other storage) is usable to store variables and other game and processor data as needed. RAM is used and holds data that is generated during the execution of an application and portions thereof might also be reserved for frame buffers, application state information, and/or other data needed or usable for interpreting user input and generating display outputs. Generally, RAM 48 is volatile storage and data stored within RAM 48 may be lost when the computing device 10 is turned off or loses power.

As computing device 10 reads media 12 and provides an application, information may be read from game media 12 and stored in a memory device, such as RAM 48. Additionally, data from storage 40, range of motion 46, servers accessed via a network (not shown), or removable storage media 46 may be read and loaded into RAM 48. Although data is described as being found in RAM 48, it will be understood that data does not have to be stored in RAM 48 and may be stored in other memory accessible to processing unit 20 or distributed among several media, such as media 12 and storage 40.

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated, via software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence or can be added, merged, or left out altogether (for example, not all described acts or events are necessary for the practice of the algorithms). Moreover, in certain embodiments, acts or events can be performed concurrently, for example, through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, for example, a combination of a DSP and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is understood with the context as used in general to present that an item, term, etc., may be either X, Y, or Z, or any combination thereof (for example, X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

It should be emphasized that many variations and modifications may be made to the above-described embodiments, the elements of which are to be understood as being among other acceptable examples. All such modifications and variations are intended to be included herein within the scope of this disclosure.

The following claims are example embodiments that are within the scope of this disclosure. The example embodiments that are listed should in no way be interpreted as limiting the scope of the embodiments. Various features of the example embodiments that are listed can be removed, added, or combined to form additional embodiments, which are part of this disclosure.

It should be understood that the original applicant herein determines which technologies to use and/or productize based on their usefulness and relevance in a constantly evolving field, and what is best for it and its players and users. Accordingly, it may be the case that the systems and methods described herein have not yet been and/or will not later be used and/or productized by the original applicant. It should also be understood that implementation and use, if any, by the original applicant, of the systems and methods described herein are performed in accordance with its privacy policies. These policies are intended to respect and prioritize player privacy, and to meet or exceed government and legal requirements of respective jurisdictions. To the extent that such an implementation or use of these systems and methods enables or requires processing of user personal information, such processing is performed (i) as outlined in the privacy policies; (ii) pursuant to a valid legal mechanism, including but not limited to providing adequate notice or where required, obtaining the consent of the respective user; and (iii) in accordance with the player or user's privacy settings or preferences. It should also be understood that the original applicant intends that the systems and methods described herein, if implemented or used by other entities, be in compliance with privacy policies and practices that are consistent with its objective to respect players and user privacy.

What is claimed:

1. A computer-implemented method comprising:
    accessing a first facial rig having a rig topology, a first set of range of motion data of facial characteristics of the first facial rig, and a first set of calculated positional coefficients for the first set of range of motion data, wherein the first set of calculated positional coefficients define positions of the facial characteristics within the first facial rig, wherein the first facial rig has a first rig identity;
    receiving input scan data comprising an input facial model and a plurality of facial expressions of facial characteristics of the input model, wherein the input facial model uses the topology of the first facial rig, wherein the input facial model has a facial model identity;
calculating positional coefficients of the input facial model for each of the plurality of facial expressions;
calculating frequency separation for a defined range of the motion data of the first facial rig resulting in first frequency data and second frequency data, wherein the first frequency data is higher than the second frequency data;
calculating frequency separation on each of the plurality of facial expressions of the input model resulting in third frequency data and fourth frequency data, wherein the third frequency data is higher than the fourth frequency data;
matching portions of the second frequency data to corresponding portions of the fourth frequency data, resulting in matched frequency data;
identifying third frequency data corresponding to the matched first low frequency data;
generating a mesh based on the third frequency data;
generating a second set of calculated positional coefficients associated with the input facial model identity; and
outputting a second facial rig having the rig topology, wherein the second facial rig is based at least in part on the mesh and the second set of calculated positional coefficients, wherein the second facial rig has a second rig identity that corresponds to the facial model identity of the input scan data, wherein the second set of calculated positional coefficients define positions of the facial characteristics within the second facial rig.

2. The computer-implemented method of claim 1, wherein the input facial model is a three dimensional model.

3. The computer-implemented method of claim 2, wherein the three dimensional model is based on two dimensional input data of a person.

4. The computer-implemented method of claim 1, wherein the input facial model is composed of a plurality of blendshapes.

5. The computer-implemented method of claim 4 further comprising dividing the blendshapes into regions and calculating coefficients for each region in each of the plurality of expressions.

6. The computer-implemented method of claim 1, wherein the coefficients correspond to displacement of the input model relative to a neutral state for each region of the input model.

7. The computer-implemented method of claim 1, wherein the plurality of facial expressions of facial characteristics of the input model are a sequence of animations.

8. The computer-implemented method of claim 1 further comprising decomposing the input scan data into direction and magnitude.

9. The computer-implemented method of claim 8 further comprising combining the direction and magnitude to generate the second facial rig.

10. The computer-implemented method of claim 1 further comprising performing principle component analysis on input scan prior to calculating frequency separation.

11. The computer-implemented method of claim 1 further comprising calculating a final mesh deformation of the plurality of expressions using matrix multiplication based at least in part on the coefficients of the input facial model.

12. The computer-implemented method of claim 1, wherein the frequency separation is calculated using a Laplacian filter.

13. A system comprising one or more processors and non-transitory computer storage media storing instructions that when executed by the one or more processors, cause the one or more processors to perform operations comprising:
accessing a first facial rig having a rig topology, a first set of range of motion data of facial characteristics of the first facial rig, and a first set of calculated positional coefficients for the first set of range of motion data, wherein the first set of calculated positional coefficients define positions of the facial characteristics within the first facial rig, wherein the first facial rig has a first rig identity;
receiving input scan data comprising an input facial model and a plurality of facial expressions of facial characteristics of the input model, wherein the input facial model uses the topology of the first facial rig, wherein the input facial model has a facial model identity;
calculating positional coefficients of the input facial model for each of the plurality of facial expressions;
calculating frequency separation for a defined range of the motion data of the first facial rig resulting in first frequency data and second frequency data, wherein the first frequency data is higher than the second frequency data;
calculating frequency separation on each of the plurality of facial expressions of the input model resulting in third frequency data and fourth frequency data, wherein the third frequency data is higher than the fourth frequency data;
matching portions of the second frequency data to corresponding portions of the fourth frequency data, resulting in matched frequency data;
identifying third frequency data corresponding to the matched frequency data;
generating a mesh based on the third frequency data;
generating a second set of calculated positional coefficients associated with the input facial model identity; and
outputting a second facial rig having the rig topology, wherein the second facial rig is based at least in part on the mesh and the second set of calculated positional coefficients, wherein the second facial rig has a second rig identity that corresponds to the facial model identity of the input scan data, wherein the second set of calculated positional coefficients define positions of the facial characteristics within the second facial rig.

14. The system of claim 13, wherein the input facial model is composed of a plurality of blendshapes.

15. The system of claim 14 further comprising dividing the blendshapes into regions and calculating coefficients for each region in each of the plurality of expressions.

16. The system of claim 13, wherein the coefficients correspond to displacement of the input model relative to a neutral state for each region of the input model.

17. The system of claim 13 further comprising decomposing input scan data into direction and magnitude.

18. The system of claim 17 further comprising combining the direction and magnitude to generate the second facial rig.

19. The system of claim 13 further comprising calculating a final mesh deformation of the plurality of expressions using matrix multiplication based at least in part on the coefficients of the input facial model.

20. A non-transitory computer storage medium storing instructions that when executed by one or more processors, cause the one or more processors to perform operations comprising:

accessing a first facial rig having a rig topology, a first set of range of motion data of facial characteristics of the first facial rig, and a first set of calculated positional coefficients for the first set of range of motion data, wherein the first set of calculated positional coefficients define positions of the facial characteristics within the first facial rig, wherein the first facial rig has a first rig identity;

receiving input scan data comprising an input facial model and a plurality of facial expressions of facial characteristics of the input model, wherein the input facial model uses the topology of the first facial rig, wherein the input facial model has a facial model identity;

calculating positional coefficients of the input facial model for each of the plurality of facial expressions;

calculating frequency separation for a defined range of the motion data of the first facial rig resulting in first frequency data and second frequency data, wherein the first frequency data is higher than the second frequency data;

calculating frequency separation on each of the plurality of facial expressions of the input model resulting in third frequency data and fourth frequency data, wherein the third frequency data is higher than the fourth frequency data;

matching portions of the second frequency data to corresponding portions of the fourth frequency data, resulting in matched frequency data;

identifying third frequency data corresponding to the matched frequency data;

generating a mesh based on the third frequency data;

generating a second set of calculated positional coefficients associated with the input facial model identity; and outputting a second facial rig having the rig topology, wherein the second facial rig is based at least in part on the mesh and the second set of calculated positional coefficients, wherein the second facial rig has a second rig identity that corresponds to the facial model identity of the input scan data, wherein the second set of calculated positional coefficients define positions of the facial characteristics within the second facial rig.

* * * * *

UNITED STATES PATENT AND TRADEMARK OFFICE
CERTIFICATE OF CORRECTION

| | |
|---|---|
| PATENT NO. | : 12,387,409 B2 |
| APPLICATION NO. | : 18/048822 |
| DATED | : August 12, 2025 |
| INVENTOR(S) | : Hau Nghiep Phan |

Page 1 of 1

It is certified that error appears in the above-identified patent and that said Letters Patent is hereby corrected as shown below:

On the Title Page

On Page 3, Column 2, Line 30, under item (56) Other Publications, delete "appear inProceedings of" and insert --appear in Proceedings of--.

In the Claims

In Column 17, Claim 1, Line 20, delete "matched first low frequency" and insert --matched frequency--.

Signed and Sealed this
Twenty-fifth Day of November, 2025

John A. Squires
*Director of the United States Patent and Trademark Office*